United States Patent [19]

Roth

[11] 3,966,226
[45] June 29, 1976

[54] FLUID SUPPLY FOR OCCUPANT RESTRAINT SYSTEM

[75] Inventor: Helmut Roth, Bloomfield Hills, Mich.

[73] Assignee: Eaton Corporation, Cleveland, Ohio

[22] Filed: Jan. 25, 1974

[21] Appl. No.: 436,400

Related U.S. Application Data

[63] Continuation of Ser. No. 244,543, April 17, 1972, abandoned.

[52] U.S. Cl. ............................. 280/737; 137/68 R; 222/5
[51] Int. Cl.² ..................................... B60R 21/08
[58] Field of Search ............. 280/150 AB; 222/3, 5; 137/67, 68

[56] References Cited
UNITED STATES PATENTS

| | | | |
|---|---|---|---|
| 2,947,315 | 8/1960 | Connell | 137/68 |
| 3,117,424 | 1/1964 | Hebenstreit | 222/3 |
| 3,163,014 | 12/1964 | Wismar | 222/3 |
| 3,232,481 | 2/1966 | Hebenstreit | 222/3 |
| 3,618,980 | 11/1971 | Leising | 280/150 AB |
| 3,663,036 | 5/1972 | Johnson | 280/150 AB |
| 3,690,695 | 9/1972 | Jones | 280/150 AB |
| 3,721,456 | 3/1973 | McDonald | 280/150 AB |
| 3,774,807 | 11/1973 | Keathley | 222/5 X |
| 3,788,667 | 1/1974 | Vancil | 280/150 AB |

*Primary Examiner*—M. H. Wood, Jr.
*Assistant Examiner*—John P. Silverstrim
*Attorney, Agent, or Firm*—Teagno & Toddy

[57] ABSTRACT

An occupant restraint system including a confinement with a collapsed inoperative condition and an expanded operative condition for restraining movement of an occupant of a vehicle during a collision of the vehicle, a fluid supply, and a diffuser for directing gas from the fluid supply into the confinement. The fluid supply includes a pressure vessel having a chamber for housing a gas generating material and an oxidizing gas. The gas generating material is combusted upon the occurrence of the collision of the vehicle to generate gas. The oxidizing gas is pressurized and reacts with the generated gas to augment the combustion process and thereby reduce the toxicity of the generated gas, and is present in a sufficient quantity to cool the generated gas to an acceptable temperature. A shear disk, seals a passage between the chamber in the pressure vessel and the diffuser. This disk is ruptured by a shear piston propelled by the pressure increase occurring upon combustion of the gas generating material.

5 Claims, 2 Drawing Figures

FLUID SUPPLY FOR OCCUPANT RESTRAINT SYSTEM

This is a continuation of application Ser. No. 244,543 filed Apr. 17, 1972 (now abandoned).

BACKGROUND OF THE INVENTION

The present invention relates generally to an occupant restraint system of the type having a confinement which is expanded by a fluid supply to restrain movement of an occupant of a vehicle during a collision. Such an apparatus is illustrated and described in U.S. Pat. Nos. 3,516,685 and 3,602,572.

The expandable confinement has a collapsed inoperative condition for storage. Expansion of the confinement is generally effected by a fluid supply in the form of a single chamber of stored pressurized gas. Although the stored gas arrangement has proven to be satisfactory in performance and simplicity, the arrangement results in a relatively large, heavy-walled, high pressure vessel. A reduction in the size of the vessel and the storage pressure of the gas would be very beneficial.

To overcome the size and pressure difficulties, it has been suggested that a pyrotechnic, gas generation device be used as a fluid supply for inflating an occupant restraint cushion. Such a concept, however, has the disadvantage that gases, such as $CO$, $NH_3$, $NO_2$, $HCN$, $SO_2$, $H_2$, $H_2S$ and $CO_2$, might be produced in sufficient quantities as to exceed desirable toxicity limits for humans in the confinement and vehicle. Further, the gas generated by a pyrotechnic type material is at a sufficiently high temperature to increase the surface temperature of the inflated confinement above a tolerable limit. Besides the toxicity and temperature problems, expansion of the confinement, in order to adequately protect the occupants of the vehicle, should be initiated within milliseconds from the time a sensed collision condition is relayed to the fluid supply. Therefore, gas must be directed into the confinement and the toxicity and temperature problems must be solved in a minute period of time in order for the fluid suply to be an effective and useful source of gas for effecting expansion of the confinement.

SUMMARY OF THE INVENTION

Accordingly, it is an object of the invention to reduce the problems of toxicity and temperature in a pyrotechnic gas generating fluid supply for an expandable confinement occupant restraint system.

Another object of the invention is to effect the rapid expansion of a confinement for an occupant restraint system by providing a gas generating fluid supply to augment a stored pressurized gas with a resultant reduction in the quantity and pressure of stored gas necessary for rapid inflation.

A further object of the invention is to provide a low toxicity, low temperature, rapid actuation continuation pyrotechnic, stored gas fluid supply for inflation of an occupant restraint system.

Yet another object of the invention is to provide a method of effecting rapid expansion of a collapsed confinement to restrain an occupant of a vehicle during a collision.

A still further object of the invention is to provide an occupant restraint system having a gas generating fluid supply which will provide a sufficient quantity of gas at an acceptable human level of toxicity and temperature to effect expansion of a collapsed confinement in time to restrain an occupant of a vehicle during a collision of the vehicle.

According to a feature of the invention a pressure vessel is provided containing both a gas generating material which is combusted upon the occurrence of a collision to generate a gas, and a pressurized oxidizing gas which is chosen to chemically filter the products of combustion, for example, by oxidizing or reducing the generated gas, to cool the generated gas prior to the entrance of any gas into the confinement and to supplement the gas generated by combustion of the gas generating material in inflating the confinement.

According to a further feature of the invention, the pressure vessel has a shear disk sealing an exit opening which communicates with the confinement, and shear means are located adjacent the shear disk and are adapted to be propelled through the shear disk in response to the generation of gas in the vessel by a gas generating material which is ignited upon the occurrence of a collision.

According to yet another feature of the invention, the gas generating material is located within a generator housing disposed within the pressure vessel and combining means are provided within the pressure vessel to bring the generated gas and the oxidizing gas together prior to their exit from the pressure vessel to facilitate further combustion of the generated gas and cool the generated gas.

According to still another feature of the invention, a method is provided in which a gas is generated in an enclosed chamber by ignition of a gas generating material after a collision condition has been sensed, this gas is then rapidly mixed with an oxidizing gas to reduce the toxicity and temperature of the mixed gas to acceptable limits, and the resulting gas mixture is then directed out of the enclosed chamber into the confinement.

These and other objects and features of the invention will be apparent from the detailed description of the preferred embodiments.

BRIEF DESCRIPTION OF THE DRAWING

Preferred embodiments of the invention are disclosed in the accompanying drawing in which.

DESCRIPTION OF THE PREFERRED EMBODIMENTS

Figure 1:
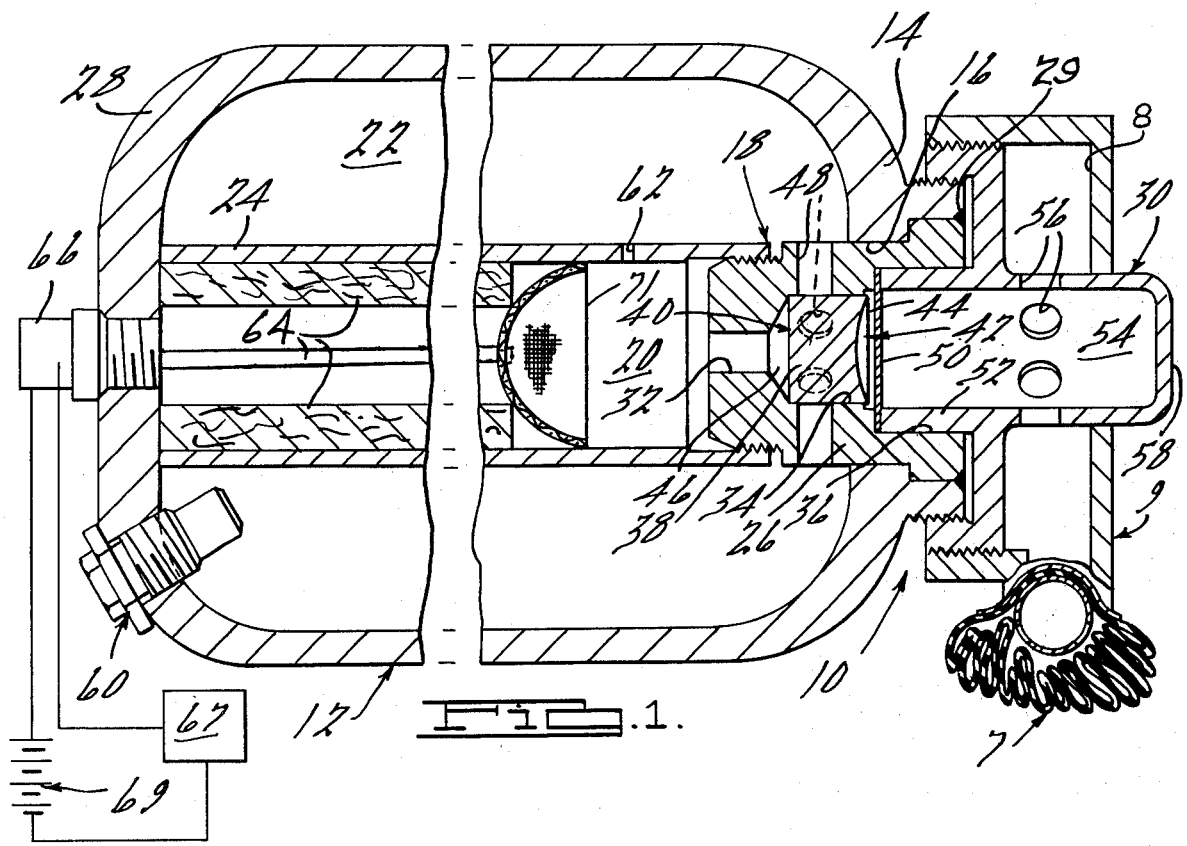
FIG. 1 is a sectional view of an occupant restraint system embodying a fluid supply according to the invention.

The occupant restraint system illustrated in FIG. 1 includes a fluid supply 10 for use with an inflatable cushion or confinement 7, commonly referred to as an air bag, and a casing 9 for distributing fluid to the confinement and referred to in the art as a diffuser. Confinement 7 has a collapsed inoperative condition for storage generally in a dashboard, steering column or other position forward of a normal vehicle occupant position of a vehicle and an expanded operative condition for restraining an occupant of the vehicle during a collision of the vehicle. Casing 9 defines a passage 8 for directing fluid from fluid supply 10 into confinement 7 to effect expansion of confinement 7. Such an occupant restraint system is illustrated and described in detail in U.S. Pat. Nos. 3,516,685 and 3,602,527 assigned to the assignee of this application. The contents of these patents are made a part of this application by reference.

Fluid supply 10 includes a cylindrically shaped pressure vessel 12 having a reduced forward portion 14 with a circular exit opening 16. A cylindrically shaped generator housing 18 divides the interior of pressure vessel 12 into a central gas generating chamber 20 and an annular gas storage chamber 22. Generator housing 18 has a tubular generator section 24 and a mixing and shearing section 26 in threaded engagement at their ends. The sections 24 and 26 are axially aligned with pressure vessel 12. Generator section 24 is in contact with the rear end 28 of pressure vessel 12 and a portion of mixing and shearing section 26 extends through opening 16. Generator housing 18 is rigidly positioned within pressure vessel 12 by a weld 29 securing section 26 to reduced portion 14 proximate opening 16. An end cap 30 is in threaded engagement with reduced portion 14 of pressure vessel 12.

Mixing and shearing section 26 of generator housing 18 includes coaxial aligned cylindrical passages 32, 34 and 36 which communicate with one another and respectively increase in cross-sectional area as they approach opening 16 from rear end 28 of the vessel 12. A cylindrical shear piston 38 is in sliding engagement with center passage 34 and includes opposed ends comprising a force receiving end 40 and a cutting end 42 having a concave configuration with an annular cutting edge 44 at the outer periphery of the cylindrical shape. Center passage 34 converges conically into passage 32 forming a cavity 46 which is partially defined in assembly by force receiving end 40 of shear piston 38. A plurality of circumferentially spaced radially extending passages 48 communicate with center passage 34 and, in assembly, are loosely sealed by the periphery of shear piston 38 permitting gas in pressure vessel 12 to completely surround shear piston 38.

A circular shear disk 50 seals outer passage 36 and is held in place by the inner annular edge of tubular section 52 of end cap 30 which slides within outer passage 36 and forces shear disk 50 against the shoulder between center passage 34 and outer passage 36. A cylindrical exit passage 54 is defined by tubular section 52 and is coaxial with center passaage 34. The cross-sectional area of exit passage 54 is slightly larger than the cross-sectional area of center passage 34. A plurality of circumferentially spaced radial exit ports 56 in tubular section 52 communicate with exit passage 54 and the passage 8 within casing 9 for directing fluid into the expandable confinement 7. The radial orientation of ports 56 precludes any net propulsive effect on fluid supply 10 as a result of the escaping gases. An end portion 58 of tubular section 52 encloses one end of exit passage 54 and is spaced at a distance from exit ports 56 which exceeds the distance between force receiving end 40 and cutting edge 44 of shear piston 38. End cap 30 is in threaded engagement with casing 9.

An inlet valve 60 of known design is located in rear end 28 of pressure vessel 12 and is used to introduce pressurized oxidizing gas, such as air, to gas storage chamber 22. Design and construction criteria of fluid supply 10 and the components thereof must be governed by the fact that the oxidizing gas will probably be at a pressure between 2000 and 2600 psi after the fluid supply is assembled. This pressure is much less than the 3600 psi presently being used in stored gas fluid supplied for occupant restraint systems. It is further desirable to have at least one small opening 62 located in generator section 24 to equalize the pressure in chambers 20 and 22 and thereby simplify construction.

Gas generating material 64 is located in the rear portion of generator section 24 of generator housing 18. The gas generating material may be in a series of thin strips attached to the inner periphery of generator section 24 in circumferentially spaced relation, or may be in any other configuration which will provide the desired combustion characteristics. Shaping of gas generating material to achieve desired combustion characteristics and pulse shaping of the flow of generated gas from pressure vessel 12 is well known in the rocket and propellant arts.

An igniter 66 of known design is threadably positioned in a central bore in rear end 28 of pressure vessel 12 and projects into gas generating chamber 20 proximate gas generating material 64. Igniter 66 is used to ignite gas generating material 64 and may be actuated by an electrical signal from a collision sensor 67 and battery 69 (schematically illustrated) such as illustrated and described in detail in U.S. Pat. No. 3,414,292 assigned to the assignee of this application. The contents of this patent are made a part of this application by reference. It may be necessary, depending upon the gas generating material used, to insert a screen 71, in the form of a cone, between gas generating material 64 and opening 62 across gas generating chamber 20 to retain combustion in a defined area without affecting gas flow.

Fluid supply 10 operates in the following manner. Upon the sensing of a collision condition by sensor 67, an electrical signal is sent to igniter 66, causing gas generating material 64 to combust to generate a gas. During combustion the pressure in gas generator chamber 20 rapidly increases due to the generation of gas in chamber 20, thereby exerting a force on force receiving end 40 of shear piston 38, driving the shear piston through shear disk 50 into the space between radial exit ports 56 and end portion 58 of end cap 30. After shear disk 50 is removed, the generated gas rapidly enters center passage 34 through inner passage 32 from gas generator chamber 20 and mixes with oxidizing gas flowing from gas storage chamber 22 through radially extending passages 48 into center passage 34. The oxidizing gas reacts with the hot generated gas to reduce and/or eliminate noxious or toxic gas constituents which may be present in the generated gas in quantities above desired human toxicity levels and further mixes with the hot generated gas to cool it to a desired temperature level, all before the mixed gas effects expansion of collapsed confinement 7. The pressurized oxidizing gas further serves as supplemental inflating fluid for expanding the confinement 7.

Generally the expansion of confinement 7 must occur in a given number of milliseconds (msec.) after a vehicle collision in order to restrain an occupant of a vehicle during a collision. It is therefore desirable, in order to have an effective fluid supply, that the shear disk 50 is removed within 5 milliseconds from the time a signal is sent to igniter 66. The use of the shear piston 38 has been found to be of great benefit in achieving removal of shear disk 50 within the desired time frame.

The size of pressure vessel 12 is largely dependent on storage pressure, desired gas expanded confinement volume and pressure, and temperature of the gas in the expanded confinement. Therefore, the suggested design that follows is not to be considered ideal for all confinement uses. In one fluid supply of the type hereinabove described, 85 cubic inches of air at an elevated pressure and in close proximity with a gas generating material 64 in pressure vessel 12 was found to be acceptable. The fluid supply was used to pressurize a confinement having 13.6 cubic foot volume to 17 psia. In two tests with this fluid supply, 30 grams of AMOCO JT-1/20 was used. This material is manufactured by Amoco Chemical Company and has a thermoplastic polyvinyl acetate binder as fuel with 20% $BKNO_3$. The center passage 34 had a diameter of 0.80 inches and was sealed by a shear disk 0.032 inches thick. Other data from the two tests follows:

|  |  | Test 1 | Test 2 |
|---|---|---|---|
| Disc type |  | 110 copper | 510 phosphor bronze |
| Pressure of stored gas |  | 2500 psia | 2250 psia |
| Composition of oxidizing gas $N_2/O_2$ |  | 82%/18% | 80%/20% |
| Gas constituents found in confinement |  |  |  |
|  | $O_2$ | 15.8% | 17.5% |
|  | $N_2$ | 78.3% | 75.4% |
|  | $CO_2$ | 1.9% | 3.6% |
|  | CO | 0.375% | 0.2% |
|  | $NO_2$ | 50 ppm | 40 ppm |
|  | $SO_2$ | 44 ppm | 80 ppm |
|  | $H_2O$ | SAT | SAT |
| Temperature increase (°F) in confinement after 60 msec. |  | 70° | 20° |
| Time after ignition to shear disc |  | 4.5 msec. | 2.2 msec. |

The toxicity of the constituent gases found in the confinement measured in accordance with accepted methods is considerably lower than prior art pyrotechnic gas generating devices, because of the oxidizing and/or reducing effect of the pressurized oxidizing gas on the generated gas in the mixing chamber and primarily because of the reaction of generated CO with oxidizing gas to form $CO_2$. The temperature of the gases found in the confinement was also considerably lower than measured in prior art gas generating devices due to the mixing of the relatively cool pressurized oxidizing gas with the relatively hot products of combustion of the gas generating material. Further, the disc in each test was sheared in less than five milliseconds after an electrical signal was received by igniter 66.

Figure 2:
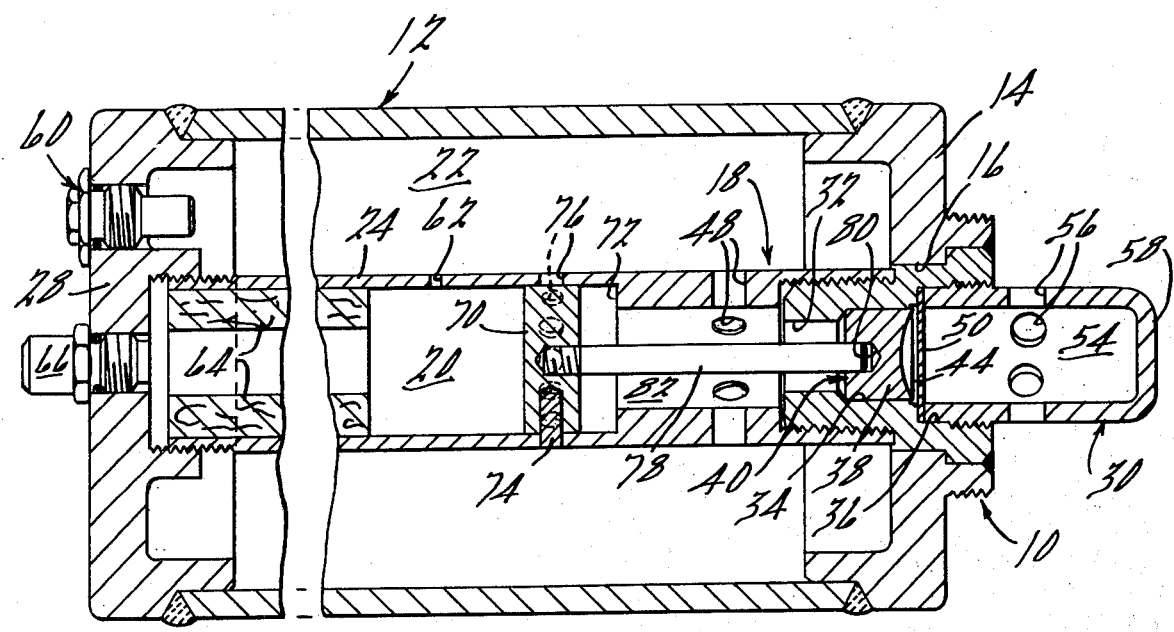
FIG. 2 is a sectional view of another fluid supply similar to the fluid supply illustrated in FIG. 1.

FIG. 2 illustrates a fluid supply 10 having a different design configuration. For ease of understanding components that are similar between the fluid supplies in FIGS. 1 and 2 are identified by identical numerals. The major differences between the fluid supplies illustrated in FIGS. 1 and 2 exist in the area of generator housing 18. Generator section 24 of generator housing 18 of FIG. 2 is in threaded engagement with rear end 28 of pressure vessel 12. A plunger 70 is in sliding engagement with the defining surface of cylindrical gas generating chamber 20 and is movable into contact with a shoulder 72. A pin 74 secures plunger 70 relative to generator section 24. Plunger 70 loosely seals a plurality of radial exit ports 76 which communicate with annular gas storage chamber 22 and gas generating chamber 20 when plunger 70 is moved. A rod 78 is in threaded engagement with plunger 70 at one end and is slidably engaged in a cavity 80 in the force receiving end 40 of shear piston 38. Rod 78 projects through a mixing chamber 82. Radially extending passages 48 communicate with mixing chamber 82 and gas storage chamber 22. The remainder of the fluid supply 10 in FIG. 2 is basically similar to the fluid supply 10 in FIG. 1.

In operation of the fluid supply 10 in FIG. 2, igniter 66 is ignited by a sensor (not shown) to combust gas generating material 64 and cause gas to be generated in gas generating chamber 20 similar to the operation described for the fluid supply in FIG. 1. A rapid pressure increase occurs in gas generating chamber 20 causing plunger 70 to be driven to the right in FIG. 2 against shoulder 72 to shear pin 74 and uncover radial exit ports 76. Simultaneously, rod 78 forces shear piston 38 through shear disk 50 allowing stored gas to exit out of radially extending passages 48. Because of the loose sliding connection between rod 78 and shear piston 38, and the force exerted on the piston, the piston continues its path of travel until it contacts end 58. As this is happening the generated gas is rapidly entering gas storage chamber 22 through ports 76, mixing and reacting with the oxidizing gas and entering mixing chamber 82 to further mix and react with the oxidizing gas before effecting expansion of a collapsed confinement.

Materials and specifications for fluid supply 10 in FIG. 1, with minor changes in some instances, are equally applicable for fluid supply 10 in FIG. 2. It should be appreciated that variations are contemplated in the type of gas generating material used and in the type of oxidizing gases used. The term oxidizing gas as used in the specification and claims is intended to refer to a gas which will augment the combustion of, or react with to form harmless gas from, the gas generated by the gas generating materials and to also cool the gas generated by the gas generating material. The oxidizing gas also supplements the generated gases in inflating the confinement.

If desired, a plurality of small passages 62 may be located in generator section 24 to aid in the mixing of the generated or produced gas with the stored gas. These passages 62 should not be sufficient in number to affect the action of shear piston 38 to rupture shear disk 50 by bleeding away the pressure needed on force receiving end 40 or on plunger 70.

What is claimed is:

1. A fluid supply for an occupant restraint system having a confinement with a collapsed inoperative condition and an expanded operative condition for restraining movement of an occupant of a vehicle during a collision of the vehicle and means for directing gas into the confinement to effect expansion thereof, the fluid supply comprising:

a vessel defining an elongated storage chamber adapted to hold pressurized fluid and an exit passage at one end of the vessel adapted for communication with the directing means and being generally concentric with the primary axis of the elongated storage chamber;

a tubular assembly passing through said exit passage and disposed concentrically within said elongated storage chamber substantially on said axis and defining a generating chamber concentric with said axis;

gas generating material located in the generating chamber and adapted to generate gas upon actuation;

means for providing fluid communication between the storage chamber, the gas generating chamber, and the exit passage, said means for providing fluid communication between the storage chamber and the gas generating chamber including means for providing continuous fluid communication therebetween;

a shear disk located within and sealing the exit passage;

a shear member having a cutting edge facing the shear disk for cutting an opening in the shear disk; and means for moving the shear member through the shear disk in response to the generation of gas to cut the opening in the shear disk to allow fluid to be released from the vessel.

2. In an occupant restraint system including a confinement having a collapsed inoperative condition and an expanded operative condition for restraining movement of an occupant of a vehicle during a collision of the vehicle, a fluid supply for providing gas for expanding the confinement, and means for directing gas from the fluid supply into the confinement, the improvement wherein the fluid supply comprises:

a vessel defining a storage chamber;

means defining an exit passage in the vessel adapted for fluid communication with the directing means;

means for sealing the exit passage;

means disabling said sealing means;

generator housing means located within the storage chamber and defining a generating chamber and a cavity and further defining at least one opening fluidly communicating the storage chamber with the generating chamber to equalize the pressure within the chambers;

gas generating material in the generating chamber adapted to generate gas upon ignition thereof;

pressurized gas in the storage and generating chambers;

means to ignite the gas generating material in response to the collision of the vehicle;

means to place the generating chamber in fluid communication with the cavity; and means defining at least one transfer passage communicating with the exit passage and the cavity and sized to allow a predetermined flow of gas therethrough, the transfer passage having a cross-sectional area less than the minimum cross-sectional area of the exit passage.

3. A fluid supply for an occupant restraint system having a confinement with a collapsed inoperative condition and an expanded operative condition for restraining movement of an occupant of a vehicle during a collision of the vehicle and means for directing gas into the confinement to effect expansion thereof, the fluid supply comprising;

a vessel defining a storage chamber adapted to hold pressurized fluid;

means defining an exit passage in the vessel adapted for fluid communication with the directing means and having a portion with parallel sides and a polygonal or curved cross section;

gas generating means located in the vessel and adapted to generate gase upon actuation, the gas generating means including generator housing means located within the storage chamber and defining a generating chamber containing gas generating material;

means interconnecting the storage chamber, the gas generating means, and the exit passage for fluid communication therebetween;

a shear disk located within and sealing the exit passage;

a shear member having a periphery substantially conforming to the periphery of the cross section of the portion of the exit passage for sliding engagement therewith and a cutting edge facing the shear disk for cutting a predetermined sized opening in the shear disk;

means for moving the shear member through the portion of the exit passage toward the shear disk in response to the generation of gas to cut the predetermined sized opening in the shear disk to allow fluid to be released from the vessel; and means for equalizing the fluid pressure throughout the generating chamber, the portion of the exit passage and the storage chamber when the exit passage is sealed.

4. In an occupant restraint system including a confinement having a collapsed inoperative condition and an expanded operative condition for restraining movement of an occupant of a vehicle during a collision of the vehicle, a fluid supply for providing gas for expanding the confinement, and means for directing gas from the fluid supply into the confinement, the improvement wherein the fluid supply comprises:

a vessel defining a storage chamber adapted to hold pressurized gas;

generator housing means defining a generating chamber;

gas generating material in the generating chamber adapted to generate gas in response to the collision;

means to ignite the gas generating material in response to the collision of the vehicle;

means defining an exit passage in the vessel in fluid communication with the storage chamber and adapted for fluid communication with the directing means;

means for sealing the exit passage;

means for disabling said sealing means in response to the collision;

means for providing a passage for generated gas to flow between the generating chamber and the exit passage upon ignition of the gas generating material; and means defining at least one passage fluidly communicating the storage chamber with the generating chamber for equalizing the gas pressure between the chambers when the exit passage is sealed.

5. A fluid supply for an occupant restraint system having a confinement with a collapsed inoperative condition and an expanded operative condition for restraining movement of an occupant of a vehicle during a collision of the vehicle and means for directing gas into the confinement to effect expansion thereof, the fluid supply comprising:

a cylindrical container having an opening at one end generally concentric with the axis of the cylindrical container;

a tubular assembly disposed concentrically within said cylindrical container substantially on said axis and defining a continuous passage concentric with said axis and extending substantially from end to end of said container and including a smooth walled cylindrical portion;

a frangible disc positioned generally within said opening and exposed at one face to one end of said passage;

pyrotechnic, gas generating material disposed in said passage adjacent the end thereof remote from said opening;

a piston member slideably positioned in said passage portion between said disc and said pyrotechnic material; and means providing continuous fluid communication between said passage and the annular space between the exterior surface of said tubular assembly and the confronting interior surface of said container.

* * * * *